May 4, 1937.  O. R. HAAS  2,078,942
DRIVING AND STOPPING MECHANISM
Filed Jan. 8, 1935  10 Sheets-Sheet 1
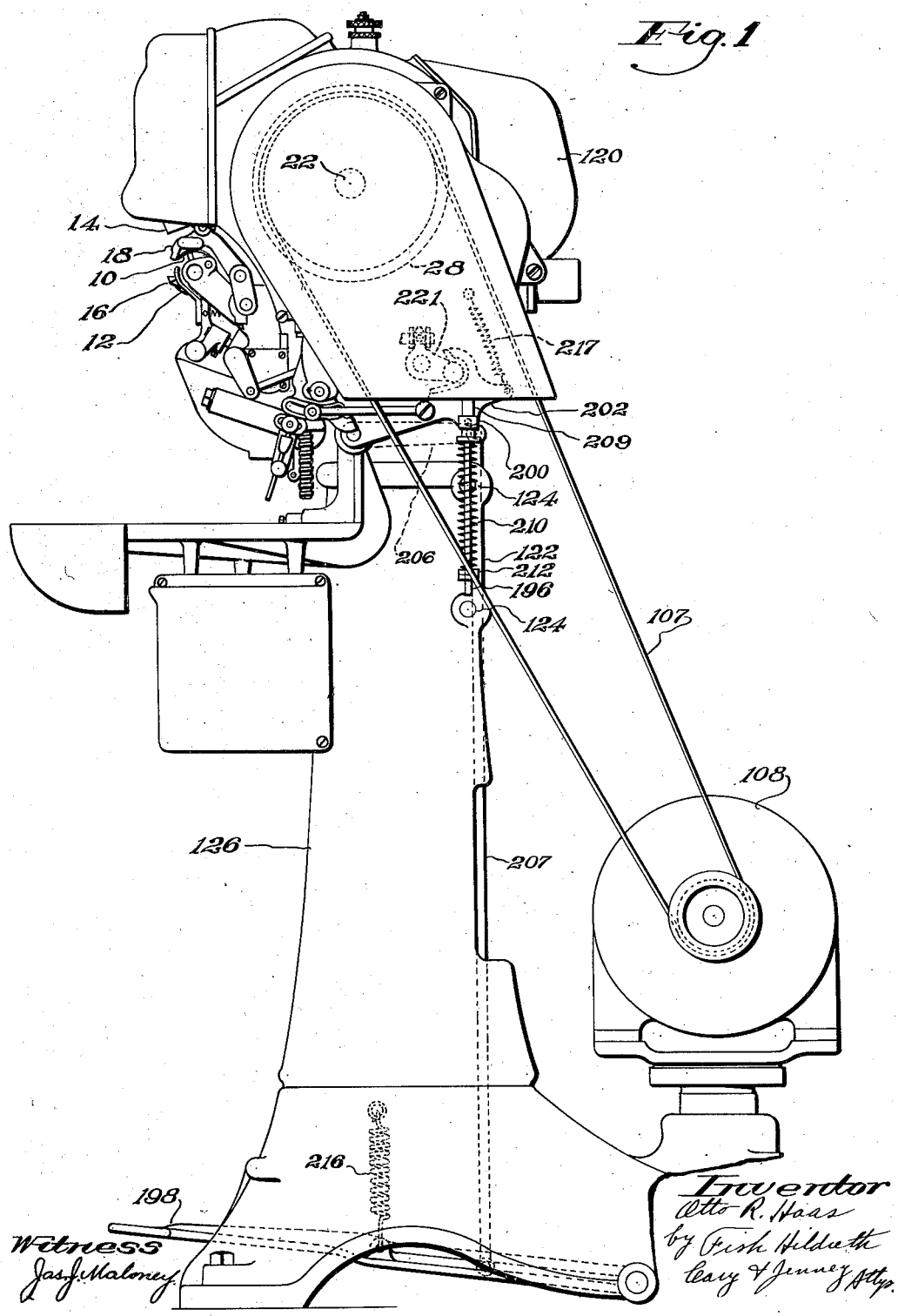

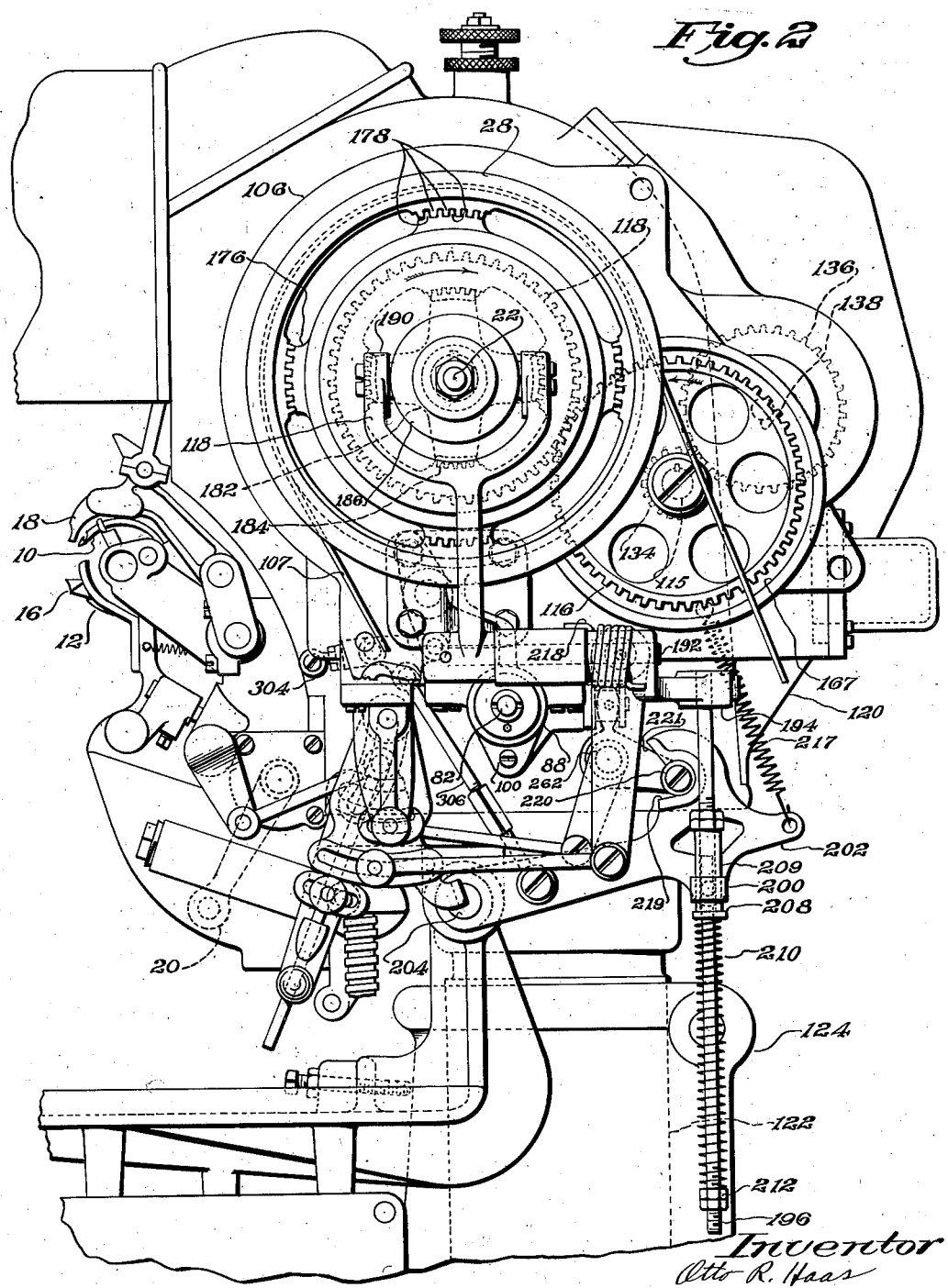

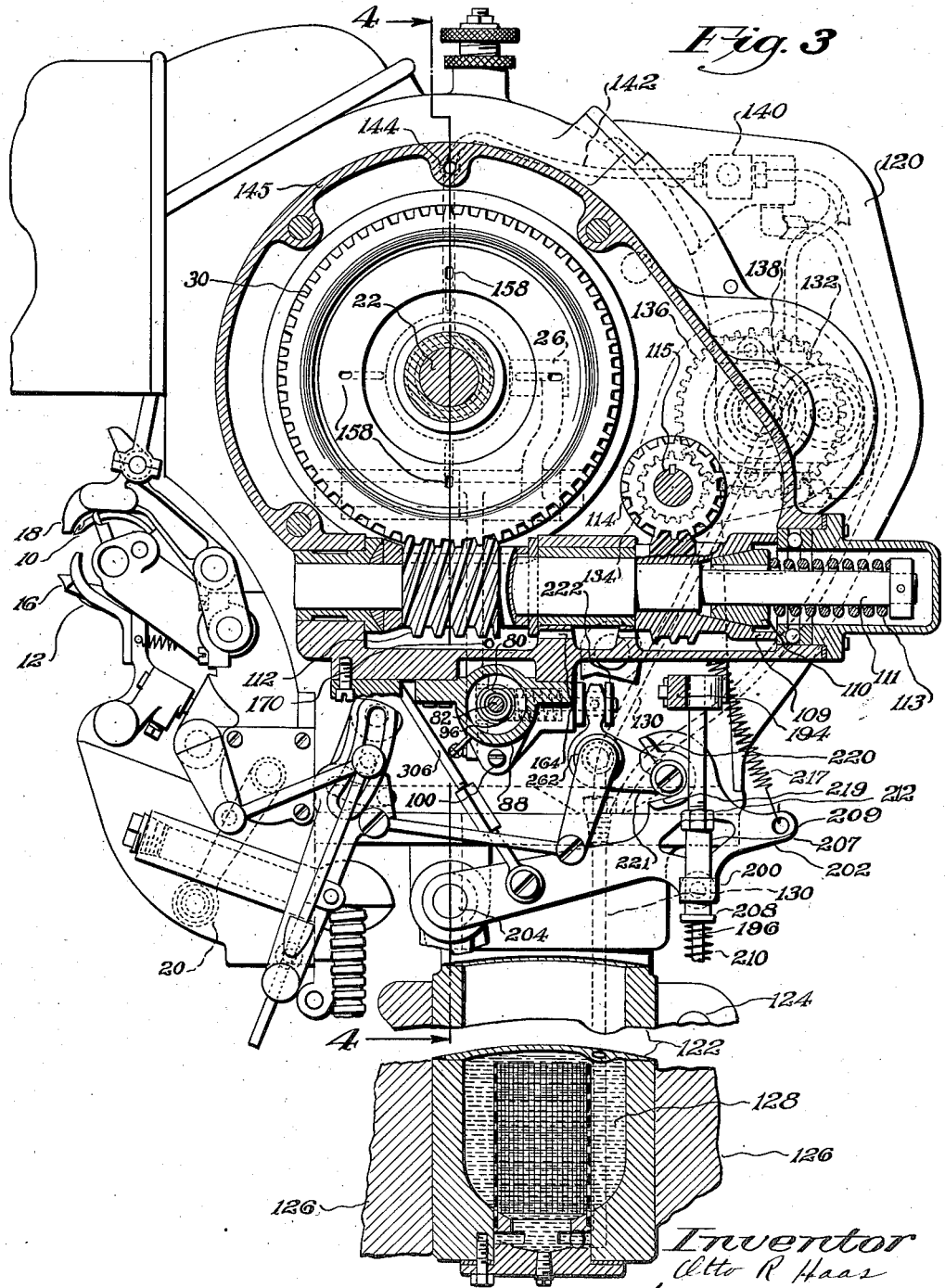

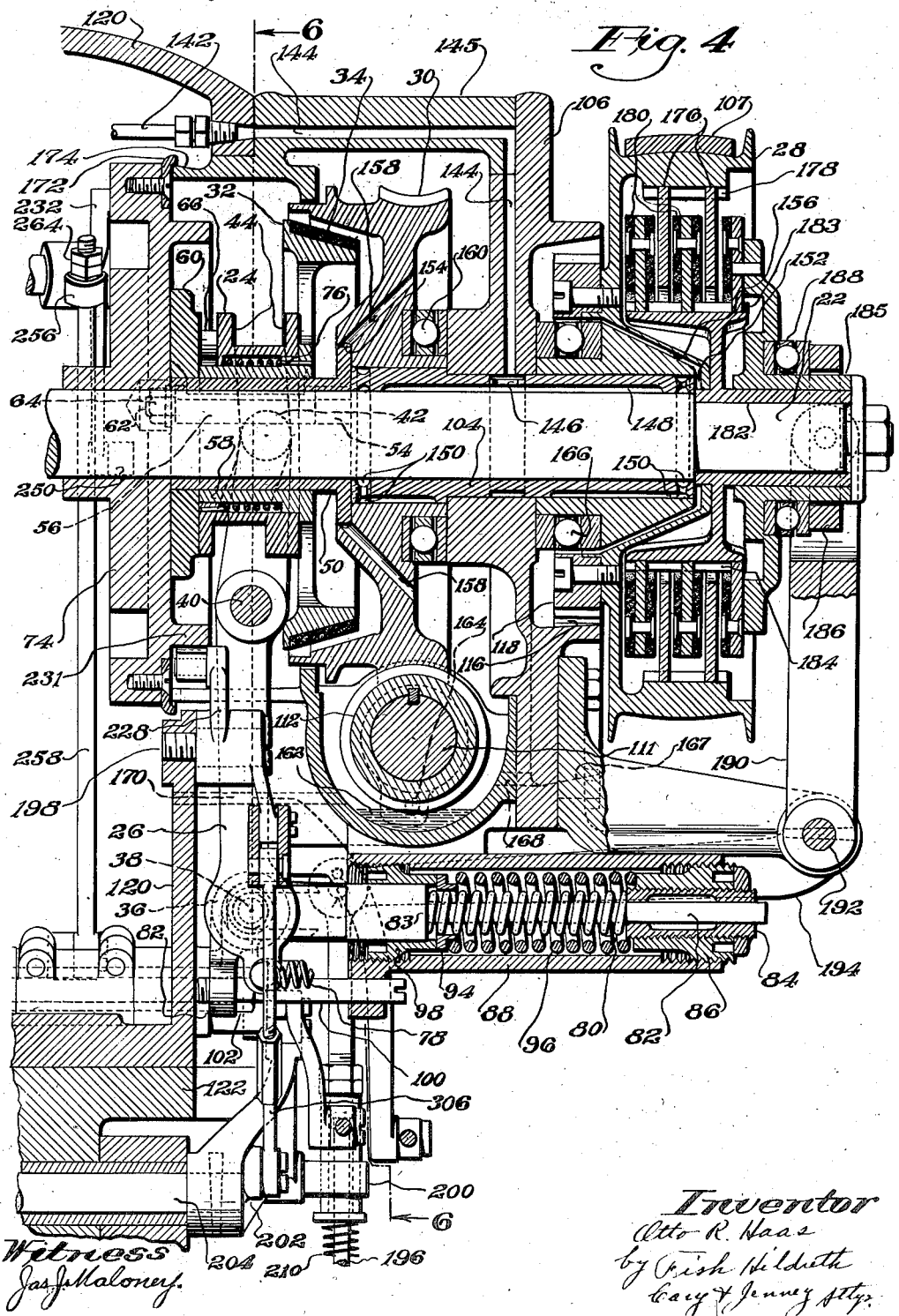

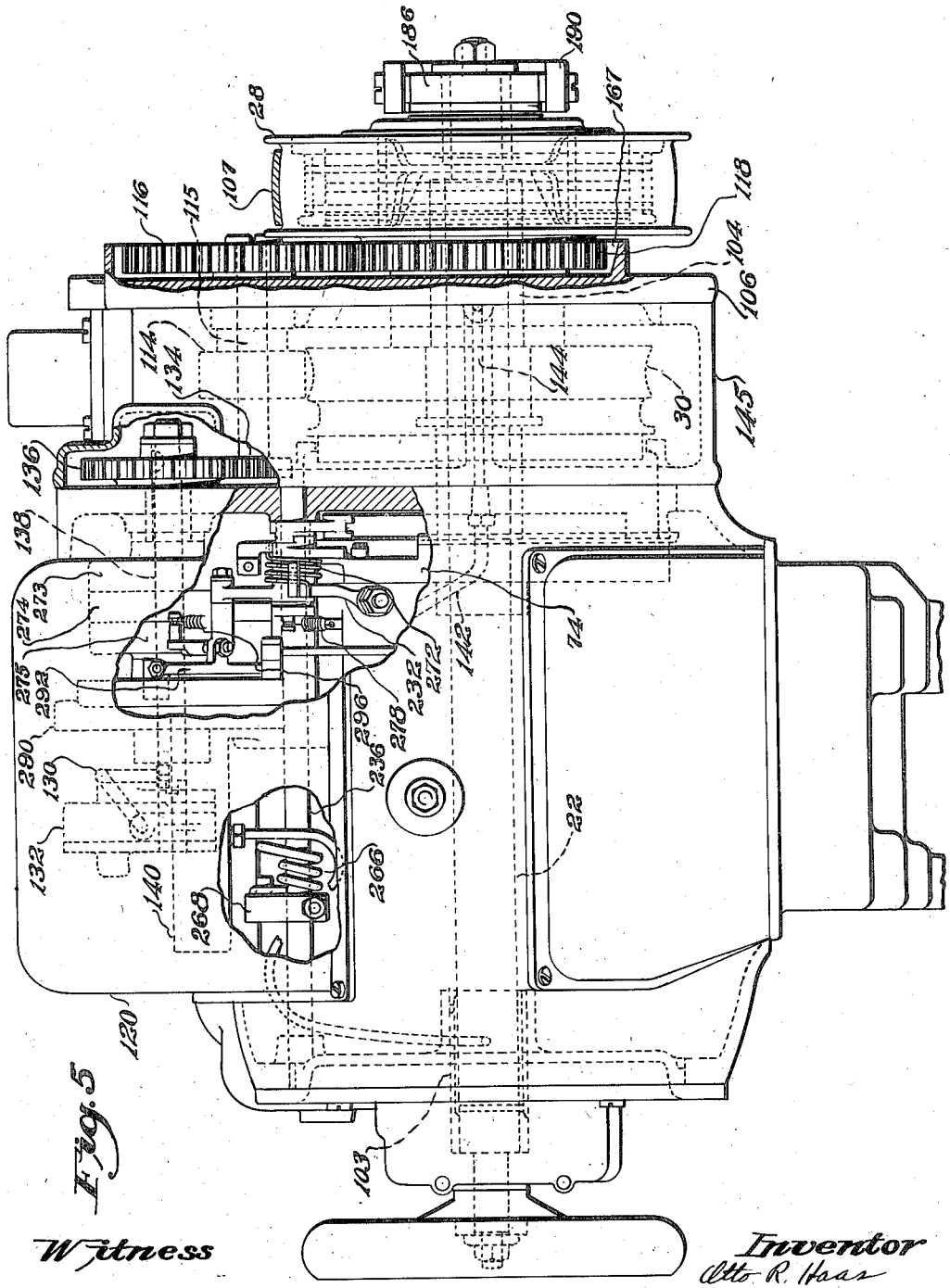

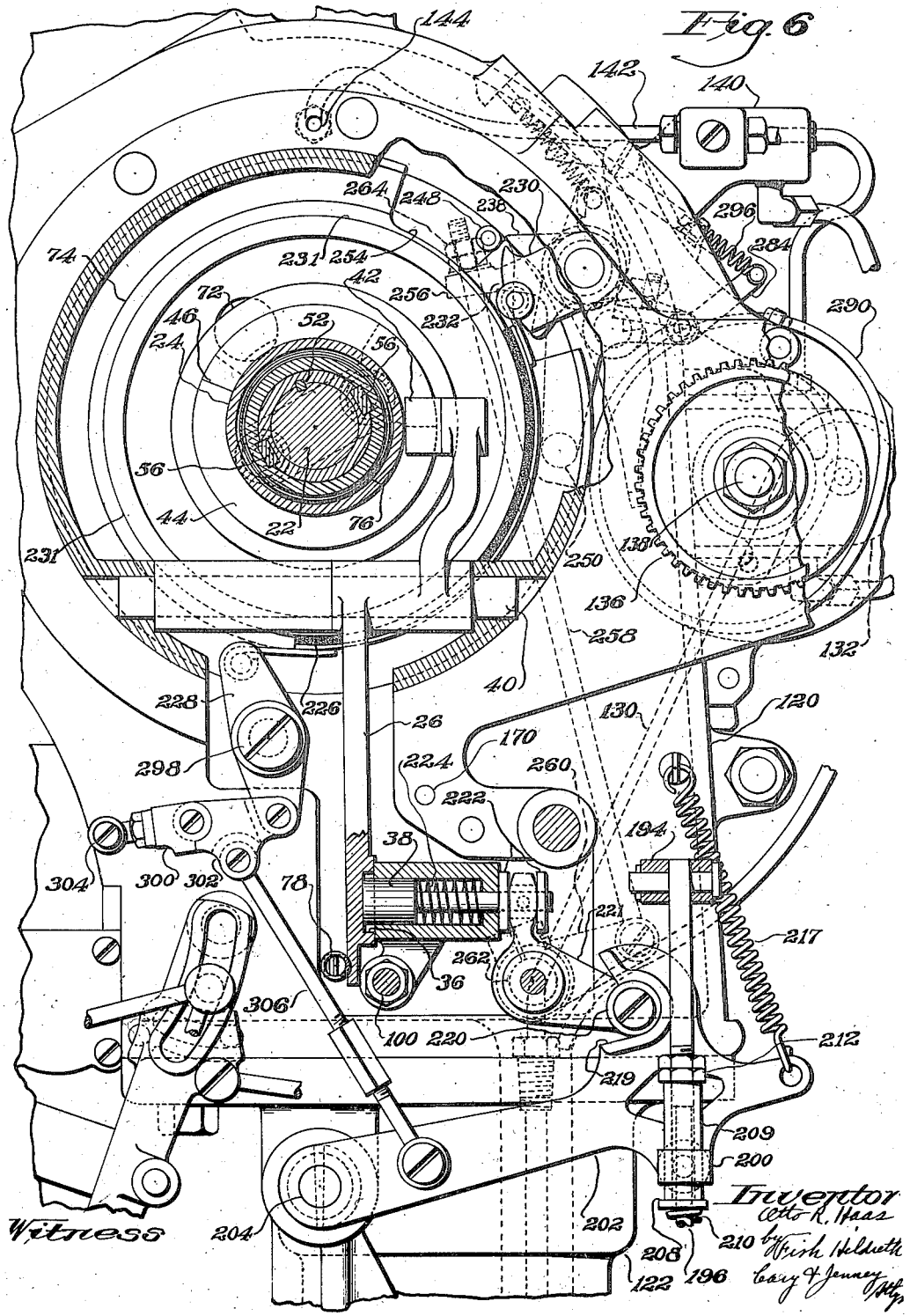

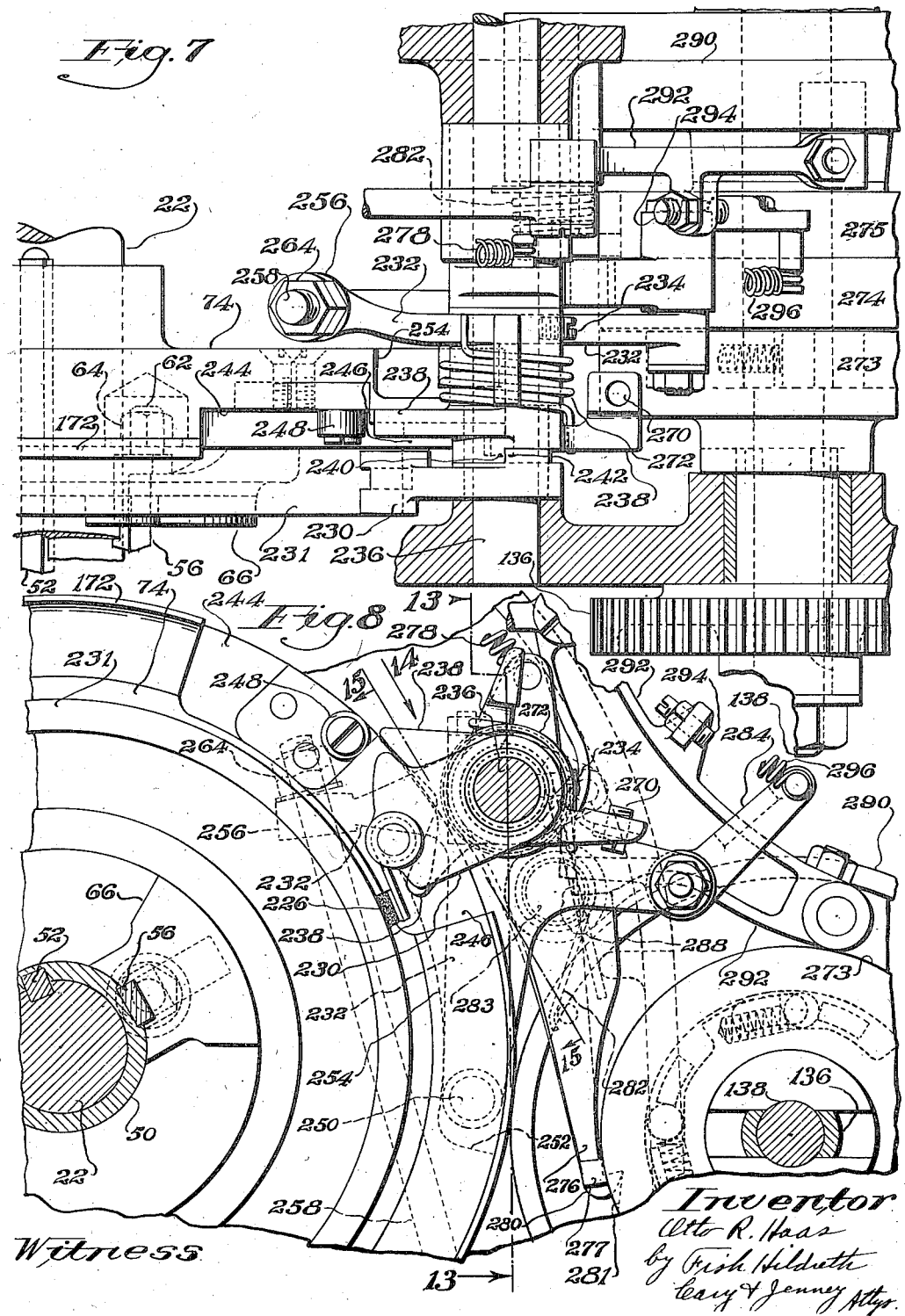

May 4, 1937.  O. R. HAAS  2,078,942
DRIVING AND STOPPING MECHANISM
Filed Jan. 8, 1935  10 Sheets-Sheet 8
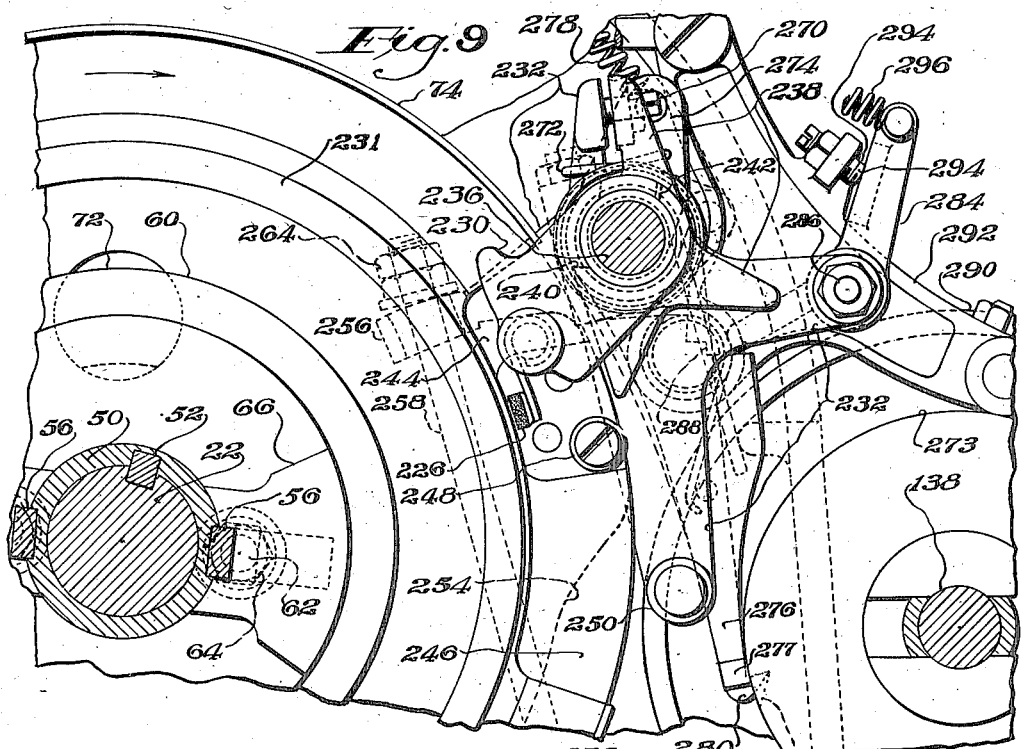
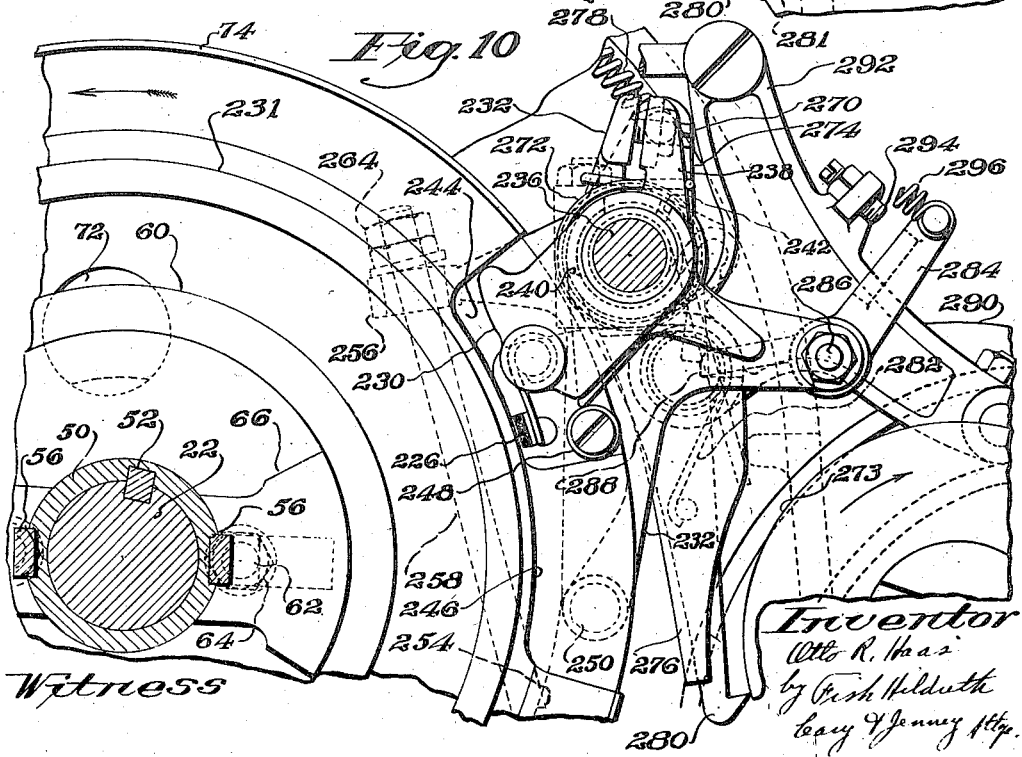

May 4, 1937.  O. R. HAAS  2,078,942
DRIVING AND STOPPING MECHANISM
Filed Jan. 8, 1935  10 Sheets-Sheet 9
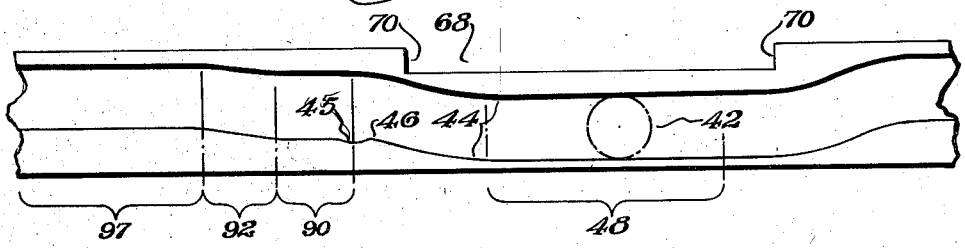
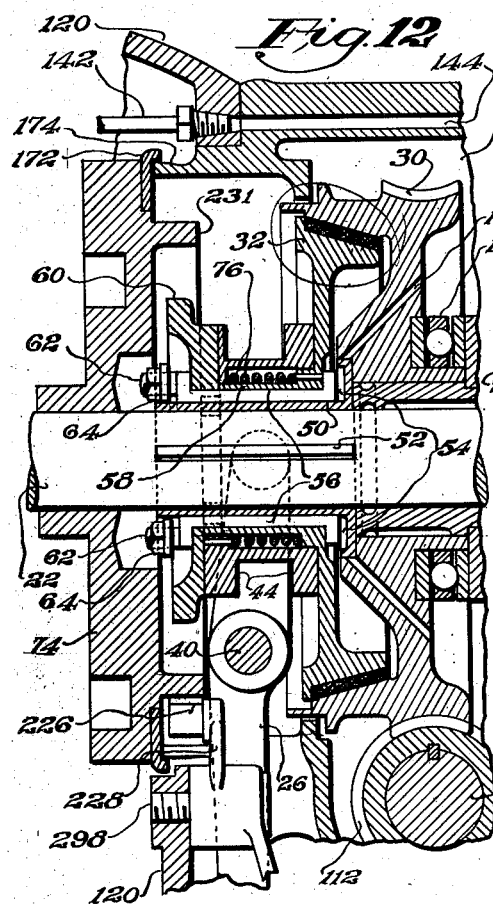
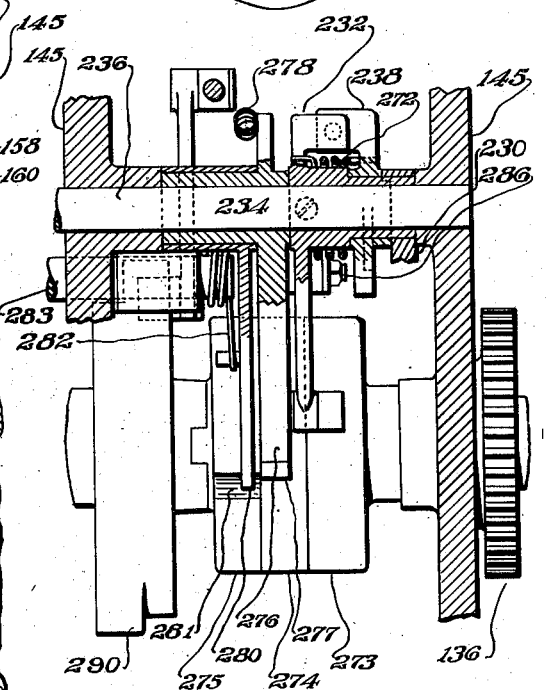
Inventor
Otto R. Haas
by Fish Hildreth
Cary & Jenney Attys.

May 4, 1937. O. R. HAAS 2,078,942
DRIVING AND STOPPING MECHANISM
Filed Jan. 8, 1935 10 Sheets-Sheet 10
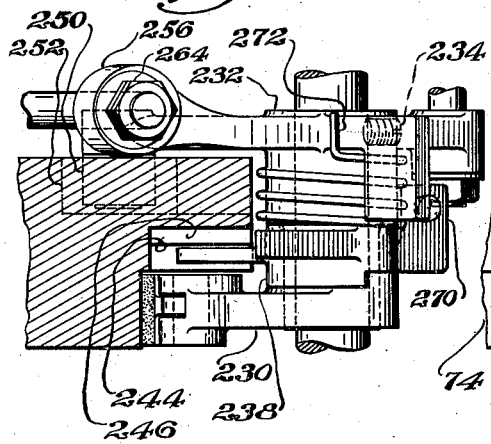
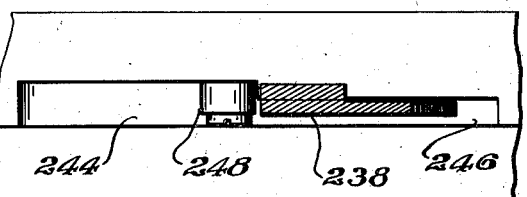
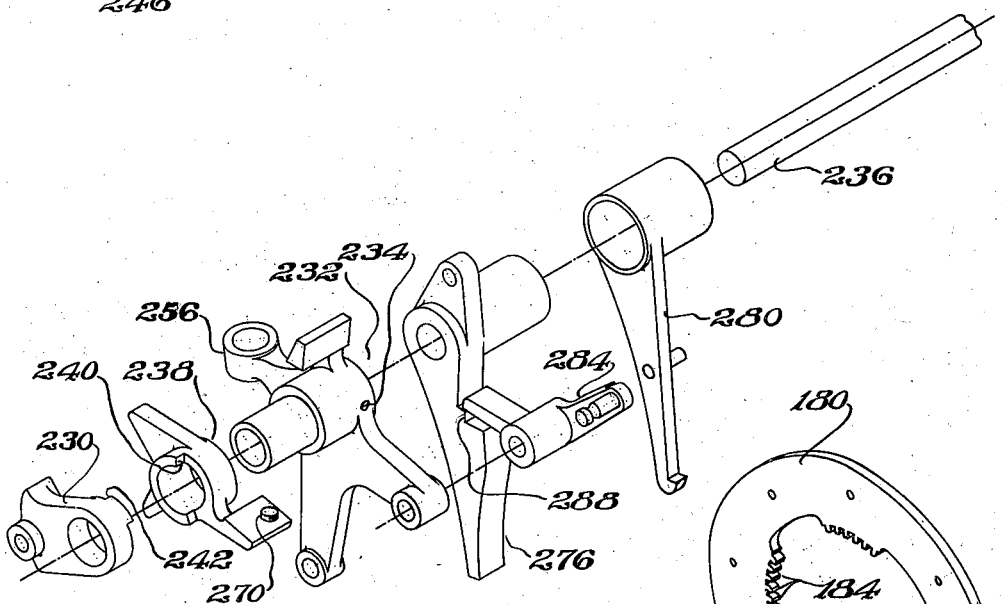
Witness
Paul F. Bryant
Inventor
Otto R. Haas
by Fish Hildreth
Cary & Jenney Attys.

Patented May 4, 1937

2,078,942

UNITED STATES PATENT OFFICE 2,078,942

DRIVING AND STOPPING MECHANISM

Otto R. Haas, North Beverly, Mass., assignor to United Shoe Machinery Corporation, Paterson, N. J., a corporation of New Jersey Application January 8, 1935, Serial No. 833

52 Claims. (Cl. 192—148)

The present invention relates to driving and stopping mechanisms and is herein illustrated as embodied in a driving and stopping mechanism particularly adapted for use in a shoe sewing machine of the type described in the patent to Topham No. 1,921,897 granted August 8, 1933.

The sewing machine described in that patent is constructed and arranged to form a lockstitch seam and, in so doing, the awl enters the work after the needle withdraws with its loop of thread and before the needle loop has been drawn down from the shuttle. This arrangement is particularly advantageous for machines intended to be operated at high speeds. To bring the machine to rest with both the needle and awl disengaged from the work, with the final stitch completed and with the parts in a position such that, when the machine is restarted, the awl will first engage the work, a driving and stopping mechanism is provided to apply a braking force to the main sewing shaft and to reverse rotation of the shaft at low speed, a portion of a turn after the final stitch is completed.

The object of the present invention is generally to improve the construction and mode of operation of a driving and stopping mechanism for a machine of the type referred to.

Other objects of the invention are to provide a novel and improved lubricating system for a driving and stopping mechanism in a machine in which the main shaft is rotated at high speed during normal operation and then for a limited time at low speed before being brought to rest.

Further objects of the invention are to provide novel and improved means for finally bringing a sewing machine of the type described in the Topham patent to rest at a predetermined point without shock or undue strain of the machine parts.

In order to complete more certainly the final stitch when the speed of the sewing shaft in the Topham machine is relatively low, it is desirable to postpone application of the braking force until just as the final stitch is being completed. By this time the awl has already formed a perforation for a new stitch and to bring the parts to a position in which, when the machine is restarted, the awl will engage the work first, the sewing shaft must be reversed a distance greater than that through which the braking force was applied. The sewing shaft of the patented machine, therefore, carries a cam for timing the application of the braking force and reversal, arranged for limited angular rotation on the sewing shaft to permit the reversal to be continued beyond the point where the braking force started, causing the awl to again enter and withdraw through the previously formed perforation.

The main shaft in the machine of the patent is rotated forwardly at high speed and reversely at low speed by either of two driver members arranged to be connected with the shaft by selectively actuable clutches. The forwardly rotating driver is connected to the shaft by manually operable means for actuating the corresponding clutch and, after the manual means is released, the timing cam actuates the reverse clutch first with a braking action to reduce the forward speed of the shaft and then to drive the shaft in a reverse direction. To cause the braking action to be applied at the proper time and the reverse movement of the shaft to be continued to a point beyond that where the braking action began, the timing cam is mounted for limited angular movement relatively to the shaft, and cooperates with an oscillating lever which, when held stationary, causes the reverse clutch to be actuated. During reversal of the shaft, a latch engages the timing cam to hold it stationary while the shaft continues to rotate beyond where the braking action started. Thereafter the latch is released and the shaft brought to rest.

A feature of the present invention contemplates the provision in a driving and stopping mechanism arranged with forward and reverse drivers, clutches and a reverse clutch timing cam mounted for limited angular rotation relatively to the driven shaft, of a follower cooperating with the cam to actuate the reverse clutch when the forward clutch is released and also arranged, when reverse rotation occurs, to hold the timing cam stationary without additional mechanism, thus simplifying the construction, and improving the operation.

Another feature of the invention contemplates the provision in a driving and stopping mechanism having high and low speed drivers and clutches all rotating on a single driven shaft of a stationary sleeve for rotatably supporting the drivers separate from the shaft so that no rotary effect will be imparted to the shaft in case of tightness or binding.

A further important feature of the invention contemplates the provision in a driving and stopping mechanism having a constantly rotating driver and friction clutch of means for conducting a continuous supply of lubricant to the bearing of the driver, a casing surrounding the bearing and passages formed in the driver for collecting the lubricant passing from the end of the bearing and directing it back to the casing to prevent it from fouling the clutch. In the construction hereinafter described employing high and low speed clutches, both are mounted on a single main shaft and are lubricated in this manner.

In the machine of the Topham patent, the high speed driver and the low speed driver are rotated by belts which, when subjected to sudden strains, may slip momentarily to relieve excess strain. In the illustrated machine the high and low speed drivers are geared directly together to rotate at fixed relative speeds so that only a single belt is required to drive the high speed driver and a friction slip clutch is provided to permit the low speed driver to remain stationary momentarily during braking action of the low speed driver.

Still other features of the invention relate to novel and improved braking and stopping devices for finally bringing the main shaft to a complete rest in a predetermined position, to a novel and improved construction for mounting a timing cam in a driving and stopping mechanism of the type described, to a novel and improved high speed clutch, to a novel and improved arrangement for actuating an auxiliary clutch after the main shaft is brought to rest and other improved constructions, combinations and arrangements of parts, the advantages of which will be readily understood by those skilled in the art from an inspection of the accompanying drawings and following specific description thereof.

Referring to the drawings, Fig. 1 is a view in side elevation looking from the right of a machine embodying the features of the present invention; Fig. 2 is a view in side elevation on an enlarged scale of the upper portion of the machine, shown in Fig. 1, with parts of the casing removed; Fig. 3 is a vertical sectional view looking from the right side of the upper part of the machine; Fig. 4 is a sectional view taken along the line 4—4 of Fig. 3 on a still further enlarged scale; Fig. 5 is a plan view of the machine, certain parts having been broken away and shown in section; Fig. 6 is a sectional view taken along the line 6—6 of Fig. 4; Fig. 7 is a plan view partly in section of a portion of the machine; Figs. 8, 9, and 10 are views in side elevation of certain parts of the machine illustrated in Fig. 7, indicating different positions assumed by the parts during operation; Fig. 11 is a diagrammatic view, illustrating the developed shape of the timing cam of the machine; Fig. 12 is a sectional view similar to that shown in Fig. 4, of certain parts of the machine, the sewing shaft being shown in a position assumed just before stopping; Fig. 13 is a vertical sectional view of other parts taken along the line 13—13 of Fig. 8; Fig. 14 is a partial sectional view of certain parts of the mechanism shown in Fig. 8, looking in the direction of the arrow 14; Fig. 15 is a sectional view taken along the line 15—15 of Fig. 8; Fig. 16 is a perspective view of certain actuating parts of the machine mounted on one of the shafts shown in Fig. 8, arranged in separated relation; and Fig. 17 is a detail perspective view of one of the main clutch parts in the machine.

The machine illustrated in the drawings is an out-sole shoe sewing machine having a curved hook needle 10, an awl 12, a shuttle 14, a work support 16, a presser-foot 18, a take-up 20 and other stitch-forming and work feeding devices constructed and arranged to operate in a manner disclosed in the patent to Topham, above identified, and in applicant's pending application Serial No. 600,016, filed March 19, 1932.

The feed of the work is produced by the work support, presser-foot and needle, these parts being mounted to move back and forth in the line of feed in a manner to impart a continuous feeding movement to the work as the main sewing shaft 22 is rotated. The stitch-forming devices of the machine are so timed that the awl enters the work after the needle withdraws from the work with its loop of thread and before the needle loop is drawn from the shuttle. In order that the material operated upon will not be crowded against the moving threads, the awl withdraws from the work before the stitch is set.

To stop the machine after the final loop of needle thread has been drawn from the shuttle, a grooved timing cam 24, best shown in Fig. 4, is mounted on the sewing shaft 22 for limited relative rotation thereon, and an oscillating follower lever 26 controls means for applying braking force to the shaft and then for reversely rotating the shaft. Reverse rotation terminates at a point in the cycle of operations in which the awl will at once enter the work when the machine is restarted forwardly. This point in the cycle of operations is reached only after the awl, during reverse rotation of the sewing shaft, has entered and again withdrawn from the work through the final perforation formed during the last portion of the forward rotation of the shaft. Also, during reverse rotation, the needle is disengaged from the work and retracted free of thread. To insure that the stitch last formed during operation of the machine will surely be set even at the lowest speed at which the machine is intended to be operated, the timing cam 24 is formed to delay the braking force until just before the final stitch is set, so that momentum of the forwardly rotating parts carried by the sewing shaft will bring the parts beyond stitch setting position.

To rotate the shaft, the right end of the shaft is surrounded by a high speed forwardly rotating driving pulley 28, and to the left of the high speed pulley there is provided a low speed reversely rotating driver 30. The braking force to reduce forward rotation of the shaft before stopping is effected by engaging a reverse clutch member 32 having a facing 34 formed with a conical surface and a correspondingly shaped surface of the driver 30. When forward rotation of the shaft is arrested, continued engagement of the clutch member 32 with the driver 30 causes the shaft to be reversely rotated. The action of the timing cam 24 and follower 26 then causes disengagement of the clutch member 32 from its driver to bring the shaft finally to rest at the proper point.

To cause actuation of the reverse clutch, the lower end of the follower lever 26 is formed with a recess 36 which is engaged by a lock bolt 38, as shown in Fig. 6. During normal operation of the machine, the follower lever is oscillated idly by the cam 24 about its fulcrum consisting of a shaft 40 secured in the frame of the machine. When the lock bolt engages the recess in the lever 26, the lever is held against oscillation, and the cam acting against the clutch member 32 forces it into engagement with its driver, the sewing shaft being thus brought to rest after a suitable reversal.

In order that the main shaft will certainly be rotated in a reverse direction through a greater angle than that through which the braking force is applied, in the machine of the Topham patent, a latch is arranged to engage a shoulder carried by the timing cam to hold it against reverse rotation with respect to the shaft through a predetermined angular movement. To actuate the latch in the proper manner towards and from the shoulder on the cam, an additional latch cam and suitable supplementary connections are necessary.

In the machine embodying the present invention, the timing cam, during reverse rotation of the sewing shaft 22, is held stationary for a predetermined number of degrees of shaft rotation as a result of the manner in which the follower lever 26 is operated. The follower lever carries at its upper end a follower roll 42 engaging the groove indicated at 44, of the timing cam 24. To hold the timing cam 24 against rotation, one side of the cam groove is formed with a depression 45 terminating in a projection 46, best shown in Fig. 11, which is engaged by the follower roll 44 when the lever 26 is held stationary. The projection 46 is formed at a point on the timing cam, which when engaged by the follower, first causes actuation of the reverse clutch during forward rotation of the sewing shaft so that during reverse rotation of the sewing shaft, as soon as the projection disengages the follower roll, the clutch member 32 is permitted to move away from the reverse driver 30. As soon as this occurs, the timing cam is returned to its original position with respect to the sewing shaft, ready for a new operation when the shaft is again rotated in a forward direction. To prevent the relative rotation of the timing cam and sewing shaft as the timing cam is being returned to its original position from affecting the reverse clutch, the timing cam is formed with a dwell portion 48 of greater angular extent than the relative angular rotation of the timing cam on the sewing shaft.

In mounting the timing cam and the reverse clutch member 32 on the shaft 22, it is desirable to secure the associated parts together with as little lost motion and looseness as possible, so that noise and wear from vibration, particularly at high speeds, will be eliminated. It is necessary to connect the timing cam and clutch member 32 together so as to provide the necessary relative angular movement while preventing relative movement lengthwise of the sewing shaft. The clutch member 32 is movable lengthwise of the sewing shaft, but must be held from relative angular movement therewith.

To facilitate assembling the parts, the clutch member 32, as shown in Figs. 4, 6, and 12, is mounted on a sleeve 50 secured to the shaft by a key 52. The sleeve 50 is formed with diametrically opposite grooves 54 engaged by a pair of keys 56, and the inner bearing surface of the hub portion 58 of the clutch member is formed with corresponding grooves to accommodate the keys 56, preventing rotation of the clutch member with respect to the sleeve 50.

To prevent movement of the timing cam with respect to the clutch member along the shaft, the timing cam surrounds the hub portion of the clutch member, and a collar 60 at the left side of the clutch member hub is clamped to the clutch member by means comprising the keys 56. The keys are formed with radially projecting portions at their ends, and also with threaded studs 62 carrying clamping nuts 64 acting against the outer surface of the collar 60.

To limit the relative rotation of the timing cam, the collar 60 is formed with a segmental projection 66 (Figs. 4 and 7 to 10) arranged to enter a recess 68 (Fig. 11) in one side of the timing cam. The ends of the recess 68 are arranged with stop shoulders 70 against which the projection 66 strikes when the timing cam is relatively rotated. To hold the collar 60 more securely in proper angular relation on the shaft 22 while permitting sliding movement along the shaft, the collar 60 is provided with a lug 72 engaging a circular opening in a cam disk 74 rigidly mounted on the sewing shaft.

As the machine reaches its final stopping position, the timing cam is restored to its normal angular position by a coil spring 76. The coil spring is disposed in an annular recess in the hub portion 58 of the clutch member with one end connected to the clutch member and the other end to the timing cam. During forward rotation of the sewing shaft, frictional engagement of the follower roll 42 with the timing cam assists the action of the spring to hold the timing cam in its normal angular position. During reverse rotation, when the follower roll engages the projection 46, the tension of the spring 76 is increased while the timing cam is being held stationary. As soon as the follower roll is disengaged from the projection, the increased tension of the spring acts to return the timing cam to its normal position.

To hold the clutch member 32 out of engagement with the driver 30 during sewing the lower end of the follower lever 26 is connected to one end of a spring 78, the other end of which is connected to the machine frame. The action of the spring 78 also holds the follower roll out of engagement with the depression 45, thus preventing noise or undesirable vibration while the machine is being operated at high speeds.

In order to stop the forward rotation of the machine as soon as possible after the last formed stitch is completed, the clutch member 32 is forced into engagement with its driver 30 with a maximum pressure directly after the stitch setting position of the sewing shaft is reached. During initial engagement of the reverse clutch member and its driver, a relatively light pressure is applied as a result of the reaction of a relatively light coil spring 80 surrounding a carrier 82 at one end of which the lock-bolt 38 is slidably mounted. The shape of cam groove 44 is such that the lock-bolt will enter the recess 36 in the cam lever 26 while the follower 42 engages the dwell portion 48. As the follower travels along the succeeding active portion of the cam groove to the projection 46, the spring 80 is compressed between a shoulder 83 on the carrier and a threaded sleeve 84 passing through a nut 86 engaging a threaded opening in one end of a tubular support 88 secured to the machine frame. As forward rotation of the sewing shaft continues, the follower roll 42 passes the projection 46 and enters a relatively short dwell portion 90 in the timing cam. During this movement, the final stitch is set, and thereafter the roll 42 is acted upon by a further active portion 92 of the cam groove to compress the spring 80 still more, moving the lock-bolt carrier 82 slightly to the right. In so doing, the shoulder 83 on the carrier engages a collar 94 against which one end of a heavy spring 96 bears, the other end being supported by the nut 86. The reaction of the heavy spring 96 then forces the clutch member 34 with a maximum pressure against the driver 30, which pressure is continued throughout a further dwell portion 97 of the timing cam of sufficient duration to arrest quickly forward rotation of the sewing shaft at the highest possible rotary speed. To prevent the heavy spring 96 from affecting the lock-bolt carrier during the first part of the braking action, the collar 94 is held away from the shoulder 83 on the lock-bolt carrier 82 by a threaded sleeve 98 engaging the tubular member 88.

The lock bolt carrier 82 is supported for sliding movement in the sleeves 84 and 98. To prevent rotation of the carrier 82, the right end is provided with a downwardly extending lug portion through which is threaded an elongated screw 100 secured in place by a lock nut 102. The screw 100 engages at one end a portion of the machine frame to limit the expansion of the spring 80 surrounding the carrier, and at the other end, the screw passes loosely through an opening formed in a lug portion of the tubular member 88. Adjustment of the screw 100 in the lug of the lock bolt carrier regulates the transverse position of the lock bolt when not engaging the recess in the follower lever 26. Adjustment of tension in the springs 80 and 96 may be suitably regulated by changing the popositions of the sleeves 84 and 98 and nut 86.

The main sewing shaft 22 is rotatably mounted in bearings 103 and 104 at the left and right of the machine frame, as shown in Figs. 4 and 5. The right bearing 104 is in the form of a sleeve fixed within a removable bearing support and cover element 106 in the machine frame. The sleeve 104 extends beyond either side of the cover 106 and forms at its ends journals for the high and low speed drivers 28 and 30 separate from the shaft 22. The frictional effect of the rotating drivers acts therefore upon the stationary sleeve 104 rather than the shaft 22 and in case of binding due to improper lubrication, or otherwise, the sewing shaft will not be rotated as would occur if the drivers were mounted directly upon the shaft.

In the machine of the Topham patent, both the high speed and the low speed drivers are rotated by means of separately driven belts operated by pulleys mounted on a suitable counter-shaft. As the machine is brought to rest, reaction of braking, particularly when the machine is operated at high speeds, tends to cause the belt for operating the low speed driver to slip, thus absorbing some of the braking energy. The present machine is constructed to be driven by a single belt connection 107 through any suitable source of rotary power such as a motor 108 and the high and low speed drivers are directly connected together by a suitable gear train.

To prevent braking reaction from producing undesirable wear or strain on the gear train, a friction slip clutch is provided having a torque transmitting force sufficient to cause reverse rotation of the sewing shaft after the shaft has momentarily been brought to rest, but with insufficient force to drive the low speed driver against the braking action produced before forward rotation stops. The slip clutch comprises a driving member 109 (see Fig. 3) and a driven member 110 secured to an auxiliary shaft 111 arranged at right angles to the shaft 22 and provided with a worm 112 meshing with teeth formed in the circumference of the driver 30. The driven member is mounted to slide along the shaft and is forced against the driving member by a spring 113 surrounding the shaft. The driving member 109 of the slip clutch is provided with helical gear teeth meshing with teeth on a corresponding gear 114 secured to a shaft 115 extending in parallel relation to the sewing shaft 22. The shaft 115 extends to the right and carries at its outer end a gear 116 (see Figs. 2 and 5) engaging a ring gear 118 rotating with the high speed driver 28. The gears 116 and 118 are of the same size so that the shaft 115 is rotated at the same speed as the sewing shaft, but the ratio of teeth between gears 109 and 114 is such that the auxiliary shaft 111 is rotated at a speed higher than that of the high speed driver. The driving action of the friction slip clutch, therefore, may be made considerably less than would be necessary if the shaft 111 were rotated at a lower speed, thus permitting a reduction in size of the parts and a more easily housed and lubricated arrangement.

The moving parts of the sewing machine are lubricated by a continuously operating pressure feed oiling system enclosed in a substantially oil-tight housing 120. To support the housing, the lower portion 122 (see Fig. 3) is constructed in hollow cylindrical form, and surrounded by clamping devices 124 to adjustably secure the housing upon a main supporting pedestal 126. The hollow cylindrical portion 122 of the housing provides a sump for retaining a supply of oil 128 from which the oil is pumped to different parts of the machine. The main supply line comprises a tube 130 extending from the oil supply 128 to a pump 132 rotated by connections to the shaft 115. The shaft 115 carries a gear 134 meshing with a gear 136 secured to a shaft 138 for actuating the pump 132. From the pump 132 the oil is supplied to a manifold 140 from which it is distributed to the different parts of the machine.

The driving and stopping mechanism of the present machine is lubricated by a pipe 142 connected between the manifold 140 and a horizontal passage 144 in a removable casing portion 145 of the machine frame, partially surrounding the drivers 28 and 30 and the bearing sleeve 104. The passage 144 extends downwardly from the frame portion 145 through the cover 106 to the bearing sleeve. The oil from the passage is conducted through an opening 146 in the bearing sleeve and into a distributing groove 148 within the sleeve to lubricate the shaft 22. At the ends of the sleeve 104 are formed internal and external circumferential grooves 150 connected together with perforations extending through the sleeve. As the oil is forced towards the ends of the sleeve along the shaft 22 it enters the internal grooves 150 and is conducted to the external grooves where it comes in contact with the drivers 28 and 30 to lubricate the external surfaces of the sleeve. The surplus oil then finds its way along the bearing surfaces of the drivers outwardly from the sleeve, either between the cover 106 and the adjacent surfaces of the drivers, or along the surfaces of the drivers adjacent the outer ends of the sleeve 104. To keep the oil from coming in contact with the clutching surfaces of the drivers, the drivers extend slightly beyond the ends of the sleeve 104 and are arranged with circular grooves 152 and 154 in the high and low speed drivers, respectively. The oil is collected in the circular grooves 152 and 154 by centrifugal force and is conducted through a series of angularly disposed radial passages 156 and 158 away from the clutching surfaces of the respective drivers.

The oil escaping from the bearing surfaces of the bearing sleeve 104 and the low speed driver 30 acts to lubricate a thrust bearing 160 located between the driver 30 and the cover portion 106 of the frame. The escaping oil is collected at the bottom of the driving and stopping mechanism casing 145 to form a bath 162 into which the worm 112 dips. The helical gear on the clutch member 109 and the gear 114 are also lubricated from this same bath by oil which passes through passages 164 beneath the shaft 111 (see Fig. 3).

The oil escaping from the bearing surfaces of the high speed driver 28 is directed across a thrust bearing 166 for the high speed driver and over the surfaces of the ring gear 118. The ring gear and the cooperating gear 116 are thereby lubricated and the excess oil is collected on an inclined ledge 167 (Figs. 2 and 4) extending from the cover 106 and surrounding the gears 116 and 118. The collected oil is then drained through a passage 168 into the bath 162. The level of the bath 162 is maintained by draining the surplus through a passage 170 into the housing 120 for the sewing mechanism where it accumulates in the supply 128. Particles of oil are prevented from escaping from the sewing housing by the cam disk 74 which is provided with a flanged ring 172 overlapping an inwardly projecting cylindrical rim 174 of the casing 145.

The clutch for connecting the high speed driver with the sewing shaft comprises the driving pulley 28 formed with side flanges to accommodate the belt 107, the inner portion being hollow to provide space for a pair of clutch driving plates 176. The clutch plates 176 are movable axially of the driving pulley, but are held against relative angular rotation by cooperating internal and external gear teeth 178 of the same size (see Fig. 2) formed respectively in the inner surface of the driving pulley and in radially projecting arms extending from the clutch plates 176. Cooperating with the plates 176 are a series of driven plates 180 (see Fig. 17) having suitable facings attached thereto. The driven plates 180 are movable axially along the shaft through their engagement with a central hub member 182 secured to the shaft and provided with arms formed with axially extending beveled projections 183 shaped to cooperate with a series of gear teeth 184 at the inner edges of the driving plates 180. By providing gear-tooth shaped connections between the clutch plates 176 and 180 and the respective rotating parts, greater tolerance in construction is permitted than with the ordinary clutch construction. The number of wearing surfaces is also sufficiently increased to obviate the necessity of specially reinforcing the clutch plates and the driving force is uniformly distributed on the teeth. The fact that the sides of the gear tooth connections are curved and formed with bevelled ends tends to cause the plates to become correctly centered, even though the connection with the respective rotating clutch parts is relatively loose and worn. The teeth being accurately spaced also provide effective means for connecting the clutch plates and rotating parts in any of a number of different angular relations so that special care to assemble the clutch parts in but one relation is unnecessary.

To compress the plates 176 and 180 into frictional engagement, the hub member is surrounded by a flanged sleeve 185, the flange of which is secured to the outermost plate 180. The sleeve member 185 is supported by a thrust bearing 188 between a collar 186 and the flange of the sleeve member 185.

To actuate the high speed clutch, the clutch collar 186 is pivotally mounted between the forked upper ends of an arm 190 fast to a shaft 192 rotatably mounted in an extending portion of the machine frame. Actuating force is applied to the shaft 192 by a horizontal arm 194 on the shaft pivotally connected at its free end to a rod 196 actuated by a foot treadle 198 (Fig. 1) in the lower base of the machine. The connections between the rod 196 and the treadle comprise a perforated block 200 through which the rod 196 loosely passes and which is pivotally mounted on an arm 202, a shaft 204 to one end of which the arm 202 is secured, an arm 206 fixed to the other end of the shaft 204 and a treadle connected rod 207 between the arm 206 and the treadle. When the foot treadle 198 is depressed, the block 200 is actuated downwardly to engage a shoulder 208 at the lower end of a sleeve 209 surrounding the rod 196 and to compress a spring 210 against a pair of lock nuts 212 threaded on the rod 196. The force of the spring 210 is transmitted to the rod to cause the high speed driving pulley to be connected to the sewing shaft 22. When the treadle is released, it is raised by a spring 216 stretched between the treadle and the pedestal 126 and a spring 217. To disconnect the driving pulley 28 from the shaft, the clutch actuating arm 190 is actuated by a coil spring 218 (see Fig. 2) surrounding the shaft 40.

To actuate the low speed clutch, the arm 202 is arranged with a cam surface 219 acting on a roll 220 mounted on one arm of a lever 221, which when the arm 202 is moved downwardly acts to withdraw the lock bolt 38 from engagement with the follower arm 26. The lock bolt 38 is connected to the lever 221 by means of a spool like member 222 engaging the bifurcated end of one arm of the lever. The spool 222 is rigidly connected with the lock bolt so that the lever 221 is rocked only when the lock bolt is actuated. When the treadle rod is released, the cam surface 219 rides along the roll 220 and a spring 224 surrounding the lock bolt causes the lock bolt to ride along the side of the oscillating follower arm until the recess registers with the lock bolt. When the follower arm reaches the proper position, the lock bolt engages the recess 36 to hold the follower arm from further oscillating movement. The sewing shaft is then quickly stopped and reversed until it reaches its final stopping position.

In order that the momentum of the parts shall not carry the sewing shaft during reversal beyond the desired position, final stopping of the shaft is effected by braking action on the cam disk 74 of a brake band 226 (Fig. 6) pivotally connected at its lower end to a lever 228 and at its upper end to a link 230 and arranged to engage a circular flange or drum 231 on the disk.

The link 230 is loosely mounted on the hub of a four-armed lever 232 (see Figs. 7, 10, and 16) secured by means of a set screw 234 to a shaft 236 rotatable in the machine frame. When the cam disk 74 is rotated reversely with the sewing shaft 22, a two-armed stopping dog 238 loosely mounted on the hub of the lever 232 is rotated in a clockwise manner, looking from the right of the machine, and the dog is provided with a shoulder 240 cooperating with a similar shoulder 242 formed on the link 230 to tighten the brake band 226 against the drum 231. To rotate the dog 238 the cam disk is formed with two intercommunicating slots 244 and 246 of different widths. The slot 244 is of suitable width to accommodate one arm of the dog 238, and the slot 246 is of suitable width to accommodate the other arm of the dog 238, but the slots are so arranged that only the second arm of the dog may enter the slot 246 (see Figs. 14 and 15).

During forward rotation in the direction of the arrow shown in Fig. 9 of the cam disk, the arms of the dog 238 do not enter the slots. As soon as the cam disk is reversed in the direction of the arrow shown in Fig. 10, the first arm of the dog is permitted to enter the slot 244 and is engaged by an abutment or roll 248 mounted between the slots in the cam disk. The dog is then rotated as previously explained to apply the brake until the first arm of the dog is entirely removed from the slot 244 as shown in Fig. 8 and the second arm of the dog enters the slot 246. By this time the brake band is tightened to its maximum tension and the shaft is stopped. The shoulder 240 on the dog 238 does not actuate the brake link 230 until the latter part of its angular rotation, the remainder of its movement being taken up by lost motion. If for any reason, however, the cam disk is not brought to a complete rest, a downwardly extending arm of the lever 232 provided with a positive stop roll 250 engages a shoulder 252 at the end of a recess 254 in the cam disc.

To withdraw the roll 250 from the recess 254, in the cam disk, the lever 232 is so arranged that it will be actuated whenever the foot treadle is depressed to rock the lever in a counter-clockwise direction. The lever 232 is formed with an arm having a perforated lug 256 through which the upper end of a rod 258 extends, the lower end of which is pivotally connected to an arm 260 as shown in Fig. 6, rigidly connected to lever 221 through a sleeve 262 on which lever 221 is rotatably mounted in the machine frame. The lever 232 is rotated in a counter-clockwise manner by the lever 221 when the treadle 198 is depressed by lock nuts 264 threaded to the upper end of the rod 258, withdrawing the roll 250 from the recess before the machine starts.

When the treadle is released, reverse rotation is imparted to the lever 232 by a coil spring 266, shown more clearly in Fig. 5, surrounding the left end of the shaft 236. One end of the spring 266 engages a portion of the machine frame and the other end, a stud projecting from a block 268 fixed to the shaft. The roll 250 is held from engagement with the recess 254 during forward rotation of the sewing shaft even though the treadle is released by a set screw 270 in an upstanding arm of the dog 238 which is engaged by an arm projecting upwardly from the hub of the lever 232, the positions of the parts during forward rotation of shaft 22 being substantially as shown in Fig. 9 of the drawings. The first arm of the dog 238 engages the periphery of the cam disk 74 which prevents movement of the dog, the set screw 270 maintaining the lever 232 in fixed position until forward rotation of the cam disk is terminated. As soon as the disk begins to rotate in a reverse direction, as shown in Fig. 10, the spring 266 rocks the shaft 236 and lever 232, thereby moving the first arm of the dog 238 into slot 244. As the cam disk continues to rotate in the reverse direction, the roll 248 rotates the dog a sufficient distance to apply the brake. To hold the dog away from the periphery of the cam disk during forward rotation, the hub of the lever 232 is surrounded by a coil spring 272, one end of which is engaged with the lever 232, and the other with the set screw carrying arm of the dog 238.

The angular arrangement of timing cam 24 and the cam disk 74 is such that the dog 238 can not enter the slots in the cam disk during forward rotation of shaft 22 because with the lock bolt not engaged in the recess 36 of the follower lever 26, the rod 258 will not permit lever 232 to rock in a clockwise direction. When the recess in lever 26 registers with the lock bolt, the slots 244 and 246 have passed the dog 238 and do not return until the shaft is reversed.

In order to effect certain auxiliary operations connected with sewing after rotation of the sewing shaft is completed, a one-revolution clutch (see Figs. 7 to 10 and 13) having a driving part 273 connected to the gear 136 and other relatively movable driven parts 274 and 278, is provided on the shaft 138 which operates the lubricating pump. The clutch is of well-known roller actuated type brought into operation by releasing a pawl 276 from engagement with an abutment 277 on the part 274 of the clutch. The pawl 276 is in the form of a lever loosely mounted on the shaft 236 and urged into engagement with the part 274 of the clutch by a coil spring 278 stretched between an upwardly extending arm of the lever 276 and the machine frame. To maintain the clutch released, a hook shaped arm 280 is also loosely mounted on the shaft 236 and yieldingly forced into engagement with a notch 281 in the clutch part 275 by a coil spring 282 surrounding a fixed stud 283. During the final portion of the reverse rotation of the cam disk 74, as the roll 250 moves into the slot 254, the lever 232 carrying on one arm a pawl latching lever 284 is rocked and the latching lever acts against a shoulder 288 on the pawl 276 to swing the pawl out of the path of abutment 277, permitting the one-revolution clutch to be actuated (see Fig. 10). The one-revolution clutch drives a cam 290 which operates a lever 292 fulcrumed on the stud 283. The lever 292 carries a set screw 294 which before the secondary clutch has completed a rotation is brought into engagement with the latching lever 284 to release the shoulder 288, permitting the pawl 276 again to stop the operation of the clutch, as shown in Fig. 8, so that the clutch will complete but a single rotation.

When the treadle is again depressed to start the machine in operation, the lever 232 is rocked in a counter-clockwise direction, causing the latching lever 284 to again engage the shoulder 288 on the pawl 276 under the influence of a spring 296 connected to the lever. The parts are thus returned to the position shown in Fig. 9 in which the pawl 276 will be released from the abutment 277, when the sewing shaft is again finally brought to rest.

Since the brake band 226 is tightened against the brake drum 231 during reverse rotation, the brake band supporting link 230 is not moved to release the brake band until after the roll 248 engages the dog 238. This occurs only after the shaft has rotated a short distance forwardly and, unless the brake were released by other means, the machine would start in an irregular manner.

To release the brake drum before the sewing shaft begins to rotate, the lever 228 to which the lower end of the brake band is pivotally connected is fulcrumed on a fixed stud 298 (see Fig. 6) and the lower end of the lever is connected to one of a pair of toggle links 300, 302, the other of which is pivotally mounted on a screw 304 threaded into the frame of the machine. When the treadle is depressed to set the machine in motion and arm 202 is moved downwardly, a link 306 connected between the arm 202 and the toggle link 302 causes the toggle to be moved into misalignment and the lever 228 to be rocked, releasing the lower end of the brake band. The link 306 is so adjusted that this occurs during the first part of the downward movement of the foot treadle before the high speed clutch is engaged. When the foot treadle is raised before stopping, the toggle links 300 and 302 are again moved into alignment preparatory for tightening the brake band against the drum during reverse rotation.

The nature and scope of the invention having been indicated, and a particular embodiment of the invention having been specifically described, what is claimed is:

1. A driving and stopping mechanism having, in combination, a main shaft, drivers for rotating said shaft in forward and reverse directions, forward and reverse clutch members movable relatively towards and from said drivers to connect said shaft with either driver, a timing cam mounted for limited relative rotation on said shaft, for engaging and disengaging the reverse clutch member with its driver, and a timing cam follower for engaging the reverse clutch member with its driver at one angular position of the main shaft and for holding the cam stationary when the main shaft is reversed to cause said clutch member to be disengaged from its driver at another angular position of the shaft.

2. A driving and stopping mechanism having, in combination, a main shaft, drivers for rotating said shaft in forward and reverse directions, forward and reverse clutch members movable relatively towards and from said drivers to connect said shaft with either driver, a timing cam mounted for limited relative rotation on said shaft for engaging and disengaging the reverse clutch member with its driver, a cam follower arranged when held stationary to engage the reverse clutch member with its driver at one angular position of the main shaft and when the main shaft is reversed to hold the timing cam from rotation with the shaft, and means for returning the timing cam to its original position on the main shaft after reverse rotation of the shaft is terminated.

3. A driving and stopping mechanism having, in combination, a main shaft, drivers for rotating said shaft in forward and reverse directions, forward and reverse clutch members movable relatively towards and from said drivers to connect said shaft with either driver, a timing cam on said shaft for engaging and disengaging the reverse clutch member with its driver, stops on the timing cam spaced to permit limited angular rotation relatively to the main shaft, a cam follower arranged when held stationary to engage the reverse clutch member with its driver at one angular position of the main shaft and when the main shaft is reversed to hold the timing cam from rotation with the shaft, and a spring for returning the timing cam to its original angular relation with the shaft after reverse rotation of the shaft is terminated.

4. A driving and stopping mechanism having, in combination, a main shaft, drivers for rotating said shaft in forward and reverse directions, forward and reverse clutch members movable relatively towards and from said drivers to connect said shaft with either driver, a timing cam on said shaft for engaging and disengaging the reverse clutch member with its driver, stops on the timing cam spaced to permit limited angular rotation relatively to the main shaft, a cam follower arranged when held stationary to engage the reverse clutch member with its driver at one angular position of the main shaft, and a projection on the cam engaged by the follower when the main shaft is reversed to cause the cam to be held from rotation and the reverse clutch member to be disengaged from its driver at another angular position of the main shaft.

5. A driving and stopping mechanism having, in combination, a main shaft, drivers for rotating said shaft in forward and reverse directions, forward and reverse clutch members movable relatively towards and from said drivers to connect said shaft with the respective driver, a timing cam on said shaft movable along the shaft to engage the reverse clutch member with its driver, stops on the timing cam spaced to permit limited angular rotation relatively to the main shaft, a movable follower for the cam, means for engaging the forward clutch member with its driver, connections for holding the follower stationary after the forwardly rotating driver is disengaged to cause the reversely rotating driver to be engaged by the respective clutch member while one stop on the cam is effective to cause rotation of the cam, and a projection on the timing cam engaged by the follower when the shaft is reversely rotated to cause the cam to be held from rotation with the shaft until the other stop on the cam is effective to cause rotation.

6. A driving and stopping mechanism having, in combination, a main shaft, drivers for rotating said shaft in forward and reverse directions, forward and reverse clutch members movable relatively towards and from said drivers to connect said shaft with either driver, a timing cam formed with a dwell portion mounted on said shaft for engaging and disengaging the reverse clutch member with its driver, stops on the timing cam spaced to permit limited angular rotation relatively to the main shaft, a follower for moving the reverse clutch member along the shaft when engaging the cam along parts other than said dwell portion and when the main shaft is reversed for holding the timing cam from rotation, and means for returning the timing cam to its original angular relation with the main shaft after the reverse clutch member is disengaged, said cam dwell portion extending through a greater angle than said limited relative rotation of the cam and shaft.

7. A driving and stopping mechanism having, in combination, a main shaft, drivers for rotating said shaft in forward and reverse directions, forward and reverse clutch members movable relatively towards and from said drivers to connect said shaft with either driver, a grooved timing cam mounted on and movable along the shaft to engage the reverse clutch member with its driver, stops on the cam spaced to permit limited angular rotation relatively to the main shaft, a movable follower engaging the cam groove, means for engaging the forward clutch member with its driver, connections for holding the follower stationary after the forwardly rotating driver is disengaged to cause the reversely rotating driver to be engaged by the respective clutch member, a projection at one side of the timing cam groove engaged by the follower when the shaft is reversely rotated to cause the cam to be held from rotation, and means for holding the follower against the other side of the cam groove when the forward clutch member engages its driver.

8. A driving and stopping mechanism having, in combination, a main shaft, drivers for rotating said shaft in forward and reverse directions, forward and reverse clutch members movable relatively towards and from said drivers to connect said shaft with either driver, a grooved timing cam mounted on and movable along the shaft to engage the reverse clutch member with its driver, stops on the cam spaced to permit limited angular rotation relatively to the main shaft, a movable follower engaging the cam groove, means for engaging the forward clutch member with its driver, connections for holding the follower stationary after the forwardly rotating driver is disengaged to cause the reversely rotating driver to be engaged by the respective clutch member, a projection at one side of the timing cam groove engaged by the follower when the shaft is reversely rotated to cause the cam to be held from rotation, and yielding means acting on the follower to hold the follower against the other side of the cam groove and to hold the reverse clutch member disengaged from the reversely rotating driver when the connections for holding the follower are inoperative.

9. A driving and stopping mechanism having, in combination, a main rotary shaft, high and low speed drivers on said shaft, high and low speed clutch members movable relatively to the drivers along the shaft to rotate the shaft at high and low speeds, manual means for engaging the high speed clutch member with its driver, a timing cam mounted on and movable along the shaft to engage the low speed clutch member with its driver, stops on the cam spaced to permit limited angular rotation relatively to the shaft, a collar on the shaft for preventing movement of the timing cam along the shaft without relatively actuating the low speed clutch member and driver, and means for clamping the collar to said clutch member.

10. A driving and stopping mechanism having, in combination, a main shaft, high and low speed drivers on said shaft, high and low speed clutch members movable relatively to the drivers along the shaft, manual means for engaging the high speed clutch member with its driver, a sleeve connected with the low speed clutch member, a timing cam mounted on said sleeve, a cam follower arranged when held stationary to cause the low speed clutch member to be engaged with its driver, stops on the cam spaced to permit limited angular rotation of the cam on said sleeve, a collar for preventing movement of the timing cam along said sleeve, and clamping means comprising keys extending along slots within the sleeve and having threaded ends for securing the collar in fixed relation to the low speed clutch member.

11. A driving and stopping mechanism having, in combination, a main shaft, high and low speed drivers on said shaft, high and low speed clutch members movable relatively to the drivers along the shaft, manual means for engaging the high speed clutch member with its driver, a sleeve portion on the low speed clutch member having internal grooves, a timing cam mounted outside said sleeve portion, a cam follower arranged when held stationary to cause the low speed clutch member to be engaged with its driver, stops on the timing cam spaced to permit limited angular rotation of the cam on said sleeve, a collar for preventing movement of the timing cam along said sleeve, keys extending along said grooves for preventing rotation of the low speed clutch member on said shaft while permitting movement along the shaft, and clamping means at the ends of said keys for securing the collar rigidly with the low speed clutch member and sleeve.

12. A driving and stopping mechanism having, in combination, a main shaft, drivers on the shaft rotating in forward and reverse directions, forward and reverse clutch members movable relatively towards and from said drivers to connect said shaft with either driver, a timing cam formed with a dwell portion and mounted on said shaft for movement along the shaft to engage and disengage the reverse clutch member with its driver, stops on the timing cam spaced to permit limited angular rotation relatively to the main shaft, a follower for moving the cam along the shaft when engaging the cam along parts other than said dwell portion, and a projection on the cam at one end of the dwell portion cooperating with the follower when the main shaft is reversed to hold the reverse clutch member in engagement with its driver and the timing cam relatively stationary until the limit of the relative shaft rotation is reached.

13. A driving and stopping mechanism having, in combination, a main shaft, forward and reverse drivers for the shaft, forward and reverse clutch members for connecting and disconnecting the drivers and shaft, a timing cam movable along the shaft to engage and disengage the reverse clutch member, a movable follower for the timing cam having a recess, a lock bolt for engaging the recess in the follower to hold the follower stationary when the forward clutch member is disengaged, a cam disk rotatable with the shaft having a slot, a stopping dog arranged to engage the slot in the cam disk, means for engaging and disengaging the forward clutch member with its driver, and connections between the lock bolt and the stopping dog to move the dog out of the path of the slot in the cam disk when the forward clutch member is engaged and to prevent the dog from reentering the slot until the shaft is reversely rotated.

14. A driving and stopping mechanism having, in combination, a main shaft, forward and reverse drivers for the shaft, forward and reverse clutch members for connecting and disconnecting the drivers and shaft, a timing cam movable along the shaft to engage the reverse clutch member with its driver after the forward clutch member is disengaged and to disengage the reverse clutch member at a predetermined point in the rotation of the shaft, a cam disk rotatable with the main shaft having a slot, a stopping dog arranged to engage the slot in the cam disk, means for engaging and disengaging the forward clutch member with its driver, and connections between the forward clutch engaging means and the stopping dog to move the dog out of the path of the slot in the cam disk when the forward clutch member is engaged and to prevent the dog from reentering the slot until the shaft is reversely rotated.

15. A driving and stopping mechanism having, in combination, a main shaft, forward and reverse drivers rotatable on said shaft, forward and reverse clutch members for connecting and disconnecting the drivers and the shaft, a timing cam movable along the shaft to engage the reverse clutch member with its driver, a follower for the timing cam having a recess, a lock bolt for engaging the recess in the follower to cause the reverse clutch member to be engaged with its driver, a cam disk rotatable with the main shaft having a slot, a stopping dog arranged to engage the slot in the cam disk, means for simultaneously engaging the forward clutch member with its driver and disengaging the lock bolt from the recess in the follower, including connections for moving the stopping dog out of the path of its slot in the cam disk and for preventing the stopping dog from reentering the slot until the lock bolt again engages the follower recess.

16. A driving and stopping mechanism having, in combination, a main shaft, high and low speed drivers rotatable about the shaft, clutch members on the shaft to connect the shaft with the high and low speed drivers, means for engaging and disengaging the clutch members from the drivers, and a stationary bearing sleeve surrounding the shaft for rotatably supporting at its ends the high and low speed drivers separate from the main shaft to prevent the shaft from being affected by rotation of the drivers.

17. A driving and stopping mechanism having, in combination, a main shaft, high and low speed drivers rotatable about the shaft, clutch members on the shaft to connect the shaft with the high and low speed drivers, means for engaging and disengaging the clutch members from the drivers, a frame between the drivers, and a stationary bearing sleeve fixed to the frame extending at either side thereof for rotatably supporting the shaft and the high and low speed drivers at its ends separate from the shaft to prevent the shaft from being affected by rotation of the drivers.

18. A driving and stopping mechanism having, in combination, a main shaft, a constantly rotating driver surrounding the main shaft, a clutch member on the main shaft having surfaces shaped to engage correspondingly shaped clutching surfaces on the driver, means for engaging the clutching surfaces of the clutch member and driver, a stationary frame, a stationary bearing sleeve extending from the frame for rotatably supporting the driver about its free end separately from the main shaft, means for conducting lubricant under pressure to the bearing sleeve, a lubricant retaining casing surrounding the bearing sleeve and a portion of the driver, and collecting passages formed in the driver for directing the lubricant passing from the end of the sleeve into the casing to prevent it from fouling the clutching surfaces.

19. A driving and stopping mechanism having, in combination, a main shaft, a constantly rotating driver surrounding the main shaft, a clutch member on the main shaft having surfaces shaped to engage correspondingly shaped clutching surfaces on the driver, means for engaging the clutching surfaces of the clutch member and driver, a stationary frame for the main shaft, a stationary bearing sleeve extending from the frame for rotatably supporting the driver about its free end separately from the main shaft, means for conducting lubricant under pressure to the bearing sleeve, a countershaft, a ring gear secured to the driver, a cooperating gear on the countershaft, a lubricant retaining casing surrounding the bearing sleeve and gears, and collecting passages formed in the driver for directing the lubricant passing from the end of the main shaft over the ring gear and into the casing to prevent it from fouling the clutching surfaces.

20. A driving and stopping mechanism having, in combination, a main shaft, high and low speed drivers rotatable about the shaft, clutch members on the shaft to connect the shaft with the high and low speed drivers, means for engaging and disengaging the clutch members from the drivers, a stationary bearing sleeve surrounding the shaft for rotatably supporting at its ends the high and low speed drivers separate from the shaft to prevent the shaft from being affected by rotation of the drivers, and means for conducting lubricant through the sleeve to said drivers.

21. A driving and stopping mechanism having, in combination, a main shaft, a high speed belt driven pulley rotatable about the shaft, a low speed driver rotatable about the shaft, a gear train beneath the shaft connecting the pulley and driver to rotate them at fixed relative speeds, clutch members on the shaft to connect the shaft with the respective pulley and driver, means for selectively engaging the pulley and driver with their clutch members, a stationary frame between the pulleys, a stationary bearing sleeve extending at either side of the frame in surrounding relation to the shaft for rotatably supporting the pulleys separate from the shaft, means for conducting lubricant to the surfaces of the bearing sleeve, and a casing for retaining a bath of lubricant passing from the sleeve about the gear train.

22. A driving and stopping mechanism having, in combination, a main shaft, a driving pulley having a belt receiving portion surrounding the shaft, a clutch member on the shaft having surfaces shaped to engage correspondingly shaped clutching surfaces on the driving pulley, means for engaging the clutching surfaces of the clutch member and driver, a stationary frame, a stationary bearing sleeve extending from the frame for rotatably supporting the pulley about its free end separately from the shaft, means for conducting lubricant to the bearing sleeve, a lubricant retaining casing surrounding the bearing sleeve, and collecting passages formed in the pulley for directing the lubricant passing from one end of the sleeve into the casing to prevent it from fouling the clutching surfaces and the belt receiving portion of the driving pulley.

23. A driving and stopping mechanism having, in combination, a main shaft, high and low speed drivers surrounding the shaft, clutch members on the shaft for connecting the high and low speed drivers to the shaft, means for selectively engaging the drivers and their clutch members, a stationary frame between the drivers, a bearing for the shaft in the frame, means for conducting lubricant through the bearing to the high and low speed drivers, a lubricant retaining casing surrounding the bearing and portions of the drivers, and collecting passages formed in the drivers for directing the lubricant passing from the bearing into the casing.

24. A driving and stopping mechanism having, in combination, a main shaft, devices operated by said shaft, a main oil retaining housing surrounding the shaft and operated devices, high and low speed drivers on the shaft, clutch members on the shaft to connect the shaft with the high and low speed drivers, a bearing between the clutch members for the shaft, a separate oil retaining casing surrounding the bearing, means for supplying lubricant from the main housing to the bearing, and means for draining the lubricant from the casing to the main housing.

25. A driving and stopping mechanism having, in combination, a main shaft, devices operated by the shaft, a main oil retaining housing surrounding the shaft and operated devices, high and low speed drivers on the shaft, clutch members on the shaft to connect the shaft with the high and low speed drivers, a bearing between the clutch members for the shaft, a gear train connecting the high and low speed drivers to rotate the drivers at fixed relative speeds, a separate oil retaining casing surrounding the bearing and the gear train to provide a bath into which the gear train dips, means for supplying lubricant from the main housing to the bearing, and means for draining the lubricant from the casing into the main housing.

26. A driving and stopping mechanism having, in combination, a main shaft, a constantly rotating high speed driver surrounding said shaft, a high speed clutch member on the shaft for connecting and disconnecting the high speed driver with the shaft, a low speed driver surrounding the shaft, a low speed braking clutch member for connecting the low speed driver to the shaft when the high speed driver is disconnected to abruptly reduce the speed of rotation of the shaft and drive it at low speed, speed reducing connections composed entirely of intermeshing toothed gears for driving the low speed driver at a definite speed relatively to that of the high speed driver, and a friction slip clutch arranged between certain of the gears to permit the relative speed of the low speed driver to be momentarily changed during braking action of the low speed clutch.

27. A driving and stopping mechanism having, in combination, a main shaft, a constantly rotating high speed driver surrounding said shaft, a high speed clutch member on the shaft for connecting and disconnecting the high speed driver with the shaft, a low speed driver surrounding the shaft, a low speed braking clutch member for connecting the low speed driver to the shaft when the high speed driver is disconnected to abruptly reduce the speed of rotation of the shaft and drive it at low speed, speed reducing connections composed entirely of intermeshing toothed gears for driving the low speed driver at a definite speed relatively to that of the high speed driver, and a friction slip clutch between certain of the gears for providing a torque transmitting force sufficient to drive the main shaft at low speed but insufficient force to drive the low speed driver during braking action of the low speed clutch.

28. A driving and stopping mechanism having, in combination, a main shaft, a constantly rotating high speed driver surrounding the shaft, a high speed clutch member on the shaft for connecting and disconnecting the high speed driver with the shaft, a worm wheel surrounding the shaft, a low speed braking clutch member for connecting the worm wheel with the shaft when the high speed driver is disconnected to abruptly reduce the speed of rotation of the shaft and drive it at low speed, an auxiliary shaft arranged at an angle to the main shaft, a speed reducing gear train consisting of a worm on said auxiliary shaft to drive the worm wheel, and other intermeshing toothed gears for driving the worm at a definite speed relatively to that of the high speed driver, and a friction slip clutch on the auxiliary shaft between the worm and the other intermeshing gears to permit the relative speeds of the worm and the high speed driver to be momentarily changed during braking action of the low speed clutch member.

29. A driving and stopping mechanism having, in combination, a main shaft, a constantly rotating high speed driver surrounding the shaft, a high speed clutch member on the shaft for connecting and disconnecting the high speed driver with the shaft, a low speed driver surrounding the shaft, a low speed braking clutch for connecting the low speed driver to the shaft when the high speed driver is disconnected to abruptly reduce the speed of rotation of the shaft and drive it at low speed, speed reducing connections certain of which are arranged to rotate at a speed higher than that of the high speed driver, and a friction slip clutch in said higher speed connections to permit the relative speed of the low speed driver to be momentarily changed during braking action of the low speed clutch member.

30. A driving and stopping mechanism having, in combination, a main shaft, a constantly rotating high speed driver surrounding the shaft, a high speed clutch member on the shaft for connecting and disconnecting the high speed driver with the shaft, a worm wheel surrounding the shaft, a low speed braking clutch member for connecting the worm wheel with the shaft when the high speed driver is disconnected to abruptly reduce the speed of rotation of the shaft and drive it at low speed, an auxiliary shaft arranged at an angle to the main shaft, a worm on said auxiliary shaft to drive the worm wheel, a friction slip clutch on the auxiliary shaft to permit the speed of the worm to be changed momentarily during braking action of the low speed clutch member and other intermeshing toothed gears for driving the worm at a speed relatively higher than that of the high speed driver.

31. A driving and stopping mechanism having, in combination, a main shaft, a high speed driver, a high speed clutch member for connecting and disconnecting the high speed driver and shaft, a low speed driver, a low speed braking clutch member for connecting the low speed driver to the shaft when the high speed driver is disconnected to reduce the speed of rotation of the shaft and drive it at low speed, and means for causing the low speed clutch member to be actuated with a uniform pressure during a predetermined portion of a rotation after the shaft is disconnected from the high speed driver and for thereafter abruptly increasing the pressure on the low speed clutch member to quickly bring the shaft to the speed of the low speed driver.

32. A driving and stopping mechanism having, in combination, a main shaft, a forwardly rotating driver, a clutch member for connecting and disconnecting the forwardly rotating driver with the shaft, a reversely rotating driver, a braking clutch member for connecting the reversely rotating driver to the shaft when the forwardly rotating driver is disconnected to reduce the speed of rotation of the shaft and drive it in a reverse direction, and means for causing the braking clutch member to be actuated with a uniform pressure during a predetermined portion of the shaft rotation until the final stitch is completed by the stitch forming devices and for thereafter abruptly increasing the pressure on the braking clutch member to quickly reverse rotation of the shaft.

33. A driving and stopping mechanism having, in combination, a main shaft, a high speed driver, a high speed clutch member for connecting and disconnecting the high speed driver with the shaft, a low speed driver, a low speed braking clutch member for connecting the low speed driver to the shaft to reduce the speed of rotation of the shaft and drive it at low speed, an oscillating lever, a lock bolt for causing the lever to engage the low speed clutch member and its driver when the high speed driver is disconnected from the shaft, and a cam connected to the low speed clutch member and formed with a cam surface for actuating the oscillating lever to cause the low speed clutch member to be engaged with two degrees of pressure, each effective over a substantial angle of sewing shaft rotation.

34. A driving and stopping mechanism having, in combination, a main shaft, a high speed driver, a high speed clutch member for connecting and disconnecting the high speed driver with the shaft, a low speed driver, a low speed braking clutch member for connecting the low speed driver to the shaft to reduce the speed of rotation of the shaft and drive it at low speed, an oscillating lever, a lock bolt for causing the lever to engage the low speed clutch member and its driver when the high speed driver is disconnected from the shaft, a lock bolt carrier, light and heavy springs effective at different times on the lock bolt carrier to cause movement of the oscillating lever to be resisted with a normal pressure when the light spring is operative and with a higher pressure when the heavy spring is operative, and a cam connected to the low speed clutch member and formed with a cam surface for actuating the oscillating lever to cause first the light spring to engage the low speed clutch with its driver and thereafter the heavy spring.

35. A driving and stopping mechanism having, in combination, a main shaft, a high speed driver, a high speed clutch member for connecting and disconnecting the high speed driver with the shaft, a low speed driver, a low speed braking clutch member for connecting the low speed driver to the shaft to reduce the speed of rotation of the shaft and drive it at low speed, an oscillating lever, a lock bolt for causing the lever to engage the low speed clutch member and its driver when the high speed driver is disconnected from the shaft, a lock bolt carrier mounted to move at right angles to the lock bolt, light and heavy springs acting on the carrier to resist movement of the carrier when the lock bolt is effective, a cam connected to the low speed clutch member and formed with a cam surface for actuating the oscillating lever to cause the reaction of the springs on the lever to engage the slow speed clutch member with its driver, and means for preventing the heavy spring from resisting movement of the oscillating lever until after a predetermined angular rotation of the sewing shaft during which the light spring is acting.

36. A driving and stopping mechanism having, in combination, a main shaft, a high speed driver, a high speed clutch member for connecting and disconnecting the high speed driver with the shaft, a low speed driver, a low speed braking clutch member for connecting the low speed driver to the shaft to reduce the speed of rotation of the shaft and drive it at low speed, an oscillating lever, a lock bolt for causing the lever to engage the low speed clutch member and its driver when the high speed driver is disconnected from the shaft, a lock bolt carrier mounted to move at right angles to the lock bolt, light and heavy springs acting on the carrier to resist movement of the carrier when the lock bolt is effective, a cam connected to the low speed clutch member and formed with a cam surface for actuating the oscillating lever to cause the reaction of the springs on the lever to engage the slow speed clutch member with its driver, and means engaging the heavy spring to prevent it from acting until the lock bolt carrier has moved a predetermined distance against the resistance of the light spring.

37. A driving and stopping mechanism having, in combination, a main shaft, a high speed driver, a high speed clutch member for connecting and disconnecting the high speed driver with the shaft, a low speed driver, a low speed braking clutch member for connecting the low speed driver to the shaft to reduce the speed of rotation of the shaft and drive it at low speed, an oscillating lever, a lock bolt for causing the lever to engage the low speed clutch member and its driver when the high speed driver is disconnected from the shaft, a lock bolt carrier mounted to move at right angles to the lock bolt, light and heavy springs acting on the carrier to resist movement of the carrier when the lock bolt acts, means engaging the heavy spring to prevent it from acting until the lock bolt carrier has moved a predetermined distance against the resistance of the light spring, and a cam connected to the low speed clutch member having a dwell surface cooperating with the oscillating lever to cause reaction of the light spring on the lever to engage the low speed clutch with its driver and having another dwell surface to cause the reaction of the heavy spring on the lever to force the low speed clutch still harder against its driver.

38. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, means acting at one end of the brake band while the shaft is reversely rotating to tighten the brake band against the drum, and means at the other end of the brake band acting before the forward driver is connected to the shaft to release the brake band from the drum, 39. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, means actuated by the shaft at one end of the brake band while the shaft is reversely rotating to tighten and hold the brake band against the drum, and manually operated means for connecting the forward driver with the shaft and for simultaneously releasing the other end of the brake band.

40. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, an abutment rotating with the shaft, a dog arranged to cooperate with the abutment when the shaft is reversed, supporting means for one end of the brake drum moved by the dog to tighten the brake band against the drum, and manually controlled means for connecting the forward driver with the shaft and for simultaneously releasing the other end of the brake band.

41. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, means actuated by the shaft at one end of the brake band while the shaft is reversely rotating to tighten and hold the brake band against the brake drum, a pair of alined toggle links for holding the other end of the brake band, and manually controlled means for connecting the forward driver with the shaft and for simultaneously moving the toggle links into misalignment.

42. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, an abutment rotating with the shaft, a dog arranged to cooperate with the abutment when the shaft is reversed, supporting means for one end of the brake drum moved by the dog to tighten the brake band, and manually controlled means for connecting the forward driver with the shaft for releasing the other end of the brake band and for simultaneously holding the dog out of the path of the abutment.

43. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, an abutment rotating with the shaft, a dog arranged to cooperate with the abutment when the shaft is reversed, supporting means for one end of the brake drum moved by the dog to tighten the brake band, and manually controlled means actuable in one direction to connect the forward driver with the shaft and to release the other end of the brake band and in the other direction to disconnect the forward driver from the shaft and to tighten said other end of the brake band.

44. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, an abutment rotating with the shaft, a dog arranged to engage the abutment when the shaft is reversed, a fixed shaft on which the dog is fulcrumed, a link pivotally mounted on the fixed shaft to movably support one end of the brake band, and a shoulder on said link engaged by the dog after a predetermined movement to cause the brake band to be tightened against the drum.

45. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, an abutment rotating with the shaft, a dog arranged to engage the abutment when the shaft is reversed, a fixed shaft on which the dog is fulcrumed, a link pivotally mounted on the fixed shaft to movably support one end of the brake band, a shoulder on said link engaged by the dog after a predetermined movement to cause one end of the brake band to be tightened and held against the drum, and means for releasing the other end of the brake band before the forward driver is again connected to the main shaft.

46. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, movable mountings at both ends of the brake band arranged to hold the band away from the brake drum when the forward driver is connected to the shaft, means for actuating one of the mountings to tighten one end of the brake band when the forward driver is disconnected from the shaft, and means actuated by the shaft during reverse rotation for actuating the other mounting to tighten the other end of the brake band.

47. A driving and stopping mechanism having, in combination a main shaft, drivers on said shaft rotating in forward and reverse directions, means for connecting the reverse driver with the shaft after the forward driver is disconnected, a brake drum on the shaft, a brake band arranged to engage the drum, an abutment rotating with the shaft, a dog arranged to engage the abutment when the shaft is reversed, a pivoted link connected to one end of the brake band, a shoulder on said link engaged by the dog after a predetermined movement to cause the brake band to be tightened against the drum during reverse rotation of the shaft, and manually operated means for connecting the forward driver with the shaft and for holding the dog out of the path of the abutment.

48. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, a cam disk on the main shaft, an abutment on the cam disk, and a two armed brake actuating dog, one arm of which cooperates with the abutment to tighten the brake band against the drum when the main shaft is reversed, and the other arm of which is brought into a position to be engaged by the abutment to release the brake band as the shaft begins to rotate forwardly.

49. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, a cam disk on the main shaft having slots spaced angularly along its circumference, and a two armed brake actuating dog, one arm of which enters one of the slots to tighten the brake band against the drum during reverse rotation of the shaft, and the other arm of which enters another of the slots at a position to release the brake band when the shaft begins to rotate forwardly to release the brake band.

50. A driving and stopping mechanism having, in combination, a main shaft, drivers on said shaft rotating in forward and reverse directions, means for connecting the reverse driver with the shaft after the forward driver is disconnected, a brake drum on the shaft, a brake band arranged to engage the drum, a cam disk on the main shaft having slots spaced angularly along the circumference, an abutment on the cam disk between the slots, and a two armed brake actuating dog, one arm of which is engaged by the abutment and enters one of the slots to tighten the brake band against the drum during reverse rotation of the shaft, and the other of which enters another of the slots after the first arm is withdrawn from its slot, the shape and spacings of said slots and arms being such that one arm may enter but one slot during rotation of the shaft.

51. A driving and stopping mechanism having, in combination, a main shaft, a high speed driver surrounding the shaft, a high speed clutch member on the shaft for connecting and disconnecting the high speed driver with the shaft, a low speed driver surrounding the shaft, a low speed braking clutch member for connecting the low speed driver to the shaft when the high speed driver is disconnected to abruptly reduce the speed of rotation of the shaft and drive it at low speed, speed reducing connections composed entirely of intermeshing toothed gears for driving the low speed driver at a definite speed relative to that of the high speed driver, a secondary shaft having a driving gear meshing with said speed reducing gears, a secondary clutch operated by said shaft, and means operative when the low speed driver is disconnected from the low speed clutch to momentarily engage said secondary clutch.

52. A driving and stopping mechanism having, in combination, a main shaft, a constantly rotating high speed driver surrounding said shaft, a high speed clutch member on the shaft for connecting and disconnecting the high speed driver with the shaft, a low speed driver surrounding the shaft, a low speed braking clutch member for connecting the low speed driver to the shaft when the high speed driver is disconnected to abruptly reduce the speed of rotation of the shaft and drive it at low speed, speed reducing connections composed entirely of intermeshing toothed gears for driving the low speed driver at a definite speed relative to that of the high speed driver, a friction slip clutch arranged between certain of the gears to permit the relative speed of the low speed driver to be momentarily changed during braking action of the low speed clutch, a secondary shaft having a driving gear meshing with said speed reducing gears between the high speed driver and the slip clutch, a secondary clutch operated by said shaft, and means operative when the low speed clutch member is disconnected from the low speed driver to momentarily engage said secondary clutch.

OTTO R. HAAS.